July 14, 1959   L. BERNER   2,894,488
COMPRESSED AIR RECIPROCATORY VIBRATOR
Filed Nov. 16, 1956   2 Sheets-Sheet 1

INVENTOR.
LEO BERNER
BY
D. Gordon Argus
ATTORNEY

July 14, 1959      L. BERNER      2,894,488
COMPRESSED AIR RECIPROCATORY VIBRATOR Filed Nov. 16, 1956      2 Sheets-Sheet 2

INVENTOR.
LEO BERNER
BY
ATTORNEY

United States Patent Office 2,894,488
Patented July 14, 1959

2,894,488

COMPRESSED AIR RECIPROCATORY VIBRATOR

Leo Berner, Pasadena, Calif., assignor to Aerojet-General Corporation, Azusa, Calif., a corporation of Ohio Application November 16, 1956, Serial No. 622,654

9 Claims. (Cl. 121—30)

The present invention relates to air operated vibrating devices and has for its general object to provide an improved device of this type adapted to be readily attached to equipment, such as sifter trays or inclined chutes for granular material, though it is not limited to such use.

Vibrators of the kind in common use are subject to rapid wear due to the incessant impacts necessary to secure vibration and their frequency and are therefore subject to frequent breakdown. Known vibrators also are often relatively complicated in construction and subject to faulty functioning from a variety of causes, such as wear in valves, undue internal friction, sticking on a dead center position, and the like.

It is an object of this invention to provide a vibrator having a minimum of wear so that it will stand up for long and uninterrupted service without repairs.

A further object of the vibrator is to provide large areas of impact to minimize wear caused by the continuous hammering of the parts setting up vibration.

Yet another object of the invention is to provide a vibrator which may be assembled from a minimum number of parts, including only two movable parts and one spring, thus reducing cost of manufacture to a minimum.

Still further objects and features of the invention will hereinafter appear from the following specification and accompanying drawings which describe and illustrate an embodiment of the invention at present considered preferable by me.

The invention is carried out by provision of a spring loaded piston within a closed cylinder provided toward one end with an inlet chamber receiving air under pressure from an outside source and provided with ports controlled by valves mounted on a rod passing through a bore in the piston.

In accordance with a feature of the invention, means are provided for limiting the relative movement between the piston and the valve rod.

The foregoing and other features of the invention will be better understood from the following detailed description and the accompanying drawings, of which:

Figures 1, 2:
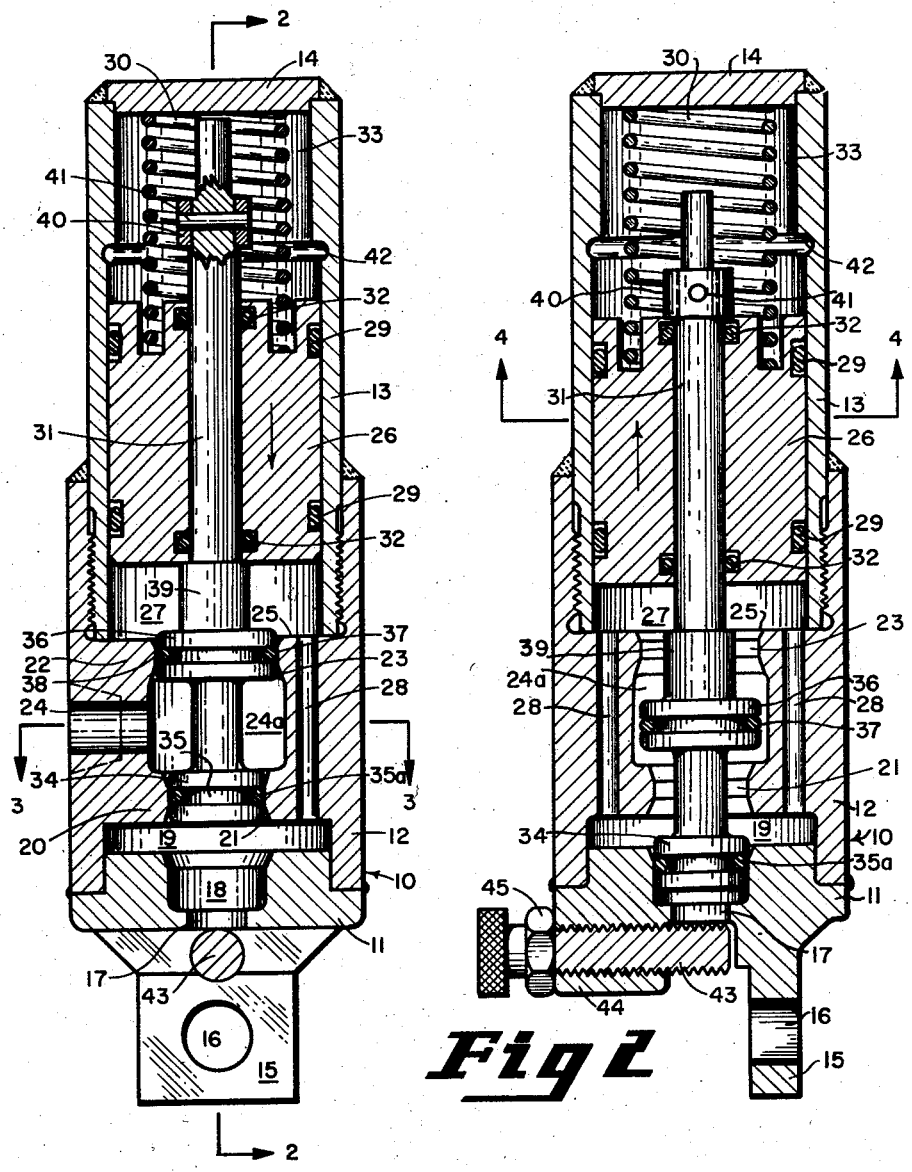
Fig. 1 is a longitudinal median section through the vibrator, the parts being shown in the position occupied during the stroke.
Fig. 2 is a section on the line 2—2 in Fig. 1, the parts being shown in the position occupied at completion of an exhaust stroke and ready for commencement of the working stroke.
Figure 3:
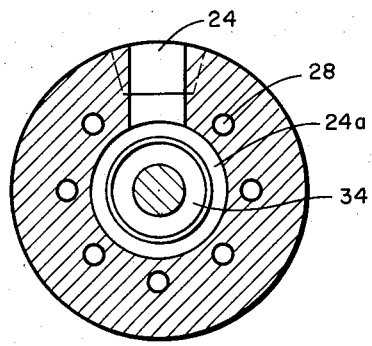
Fig. 3 is a section on the line 3—3 in Fig. 1.
Figure 4:
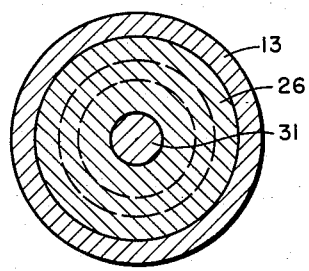
Fig. 4 is a section on the line 4—4 in Fig. 2.

Referring now to Fig. 1, the numeral 10 indicates generally a cylinder assembly having a valve head 11 at one end, a valve body 12 sealed to the valve head, and to the cylinder 13 which is closed, after the positioning of interior parts, by a cylinder head 14 sealed to the cylinder. Preferably an attachment lug 15 drilled with an attachment hole 16 is cast integral with either the valve head or cylinder head or both. The valve head 11 is formed with an exhaust port 17 opening into an exhaust port recess 18 shaped to closely fit a part later referred to, the recess 18 opening into a larger recess or exhaust port chamber 19. A peripheral wall 20 projecting inwardly of the inner surface of the cylinder 13 is bored to provide an opening for the passage of the part adapted to enter recess 18, the opening constituting a port 21. A second inwardly projecting wall 22 spaced from wall 20 defines a chamber into which pressure air is admitted. Wall 22 is bored and also provides a port 23 to permit passage of a further part (later referred to), said further part being of greater diameter than port 21. An inlet port 24 for pressure air is formed in the valve body and leads into the chamber 24a between the walls 20 and 22. The inward face 25 of wall 22 forms a stop limiting the movement in one direction of a free piston 26 arranged in the cylinder. The space 27 between wall 22 and said piston 26 comprises the working space of the vibrator. Passages 28 in the wall of the valve body connect the working space inward of wall 22 with recess 19. Pressure sealing means 29 are arranged between the cylinder wall and piston surface.

A light helical spring 30 is arranged between piston 26 and cylinder head 14. A valve rod generally indicated at 31 is mounted to slide in an axial hole drilled in the piston and serves to control the valves of the vibrator. Pressure sealing means 32 are arranged between the wall of the bore in the piston and the surface of the valve rod 31, thus the space 33 between the piston and cylinder head provides a permanently closed air space.

A disc-like enlargement 34 of the rod 31 is formed to closely fit opening 21, and a peripheral groove 35 is formed in the edge of disc 34 in which an O ring seal 35a is mounted. A second disc-like enlargement 36 of the valve rod is spaced from disc 34 a distance equal to the spacing of walls 20 and 22, the diameter of disc 36 being such as to closely fit the port 23 in wall 22.

A peripheral groove 37 is provided in the edge of disc 36 and O ring seal 38 is mounted in the groove. The reason for forming disc 36 of a larger diameter than disc 34 will be explained later.

A stop 39 is provided by a portion of the valve rod 31 of enlarged diameter, or as a sleeve pinned to the rod, to limit the travel of the piston 26 relative to the valve rod when the piston commences its return or exhaust stroke as shown in Fig. 1.

A second stop 40 is provided on the end portion of the valve rod 31 and is formed as a collar pinned to the valve rod by pin 41. The length of the valve rod is such that when at its limit of movement toward cylinder head 14, whether or not the rod actually contacts the cylinder head, disc valves 34 and 36 are in closed position. Preferably a slight overtravel of the rod is provided to insure contact of the piston with peripheral shoulder 42 on the inner surface of the cylinder before the rod can contact the cylinder head.

It may be desirable to adjust the force of the frequency of the vibration set up by the vibrator independently of varying the usual control valve of the pressure air line, and this is provided for by adjusting the back pressure on the exhaust port 17, for instance, as shown in Figs. 1 and 2, by arranging a screw 43 having a milled head and having a diameter equal to that of the exhaust port and mounted for vertical movement across the exhaust port in a lug 44 projecting from the valve head 11. Screw 43 may be locked in adjustment by a jam or lock nut 45.

The operation of the vibrator of my invention is as follows:

Fig. 1 shows the vibrator with compressed air acting on both discs 34 and 36, piston 26 having been moved against stop 39 by travelling in the direction of the arrow under the action of spring 30 and by the compressed but expanding trapped air in the space 33, which imparts extra force to the return stroke of the piston 26.

The spring 30 is required in order to provide a positive full return stroke of piston 26, since the air pressure in the air space 33 drops to zero at the end of the return stroke; but extra power and speed is required at that time to shift the valve rod 31 in the direction of the arrow to set the valve for a power stroke to overcome the additional friction of seals 35a and 38, and to overcome the unbalanced air pressure on the face of disc 36, which is of larger diameter than disc 34.

The unbalanced force on disc 34 is necessary to hold the valve rod 31 in the position shown in Fig. 1 against the friction of seals 32, and the slight air pressure exerted against the working space face of disc valve 36 by the movement of the piston toward the exhaust port 17, in the direction of the arrow, in moving from a contact with cylinder stop 42 to a contact of piston 26 with valve rod shoulder 39, previous to moving the valve rod also toward the exhaust port.

The power of spring 30 now positively continues to move both piston 26 and valve rod 31 in the direction of the arrow until the piston 26 is stopped by contact with wall face 25. This stop is sudden and uncushioned, producing shock and vibration, the desired effect of the vibrator. While the piston 26 moves in the direction of the arrow in Fig. 1, the air in space 27 escapes through passages 28 into chamber 19 and from there through port 17 to the outside air. The incoming pressure air is completely sealed off during the time the disc valves are traversing the ports 21 and 23.

Although the piston 26 has been stopped as described above, the valve rod 31 will, due to its inertia, continue to move in the direction of the arrow until stopped by contact of the disc valve 34 with the valve head 11 around the outlet port 17. It should be noted, however, that this extra motion of the valve rod is desirable to make sure that the shock of piston stoppage is between the piston and the large surface of wall 20.

With the valve rod 31 now in the position illustrated in Fig. 2, the exhaust port 17 is closed by contact of disc valve 34 with the wall of recess 18. Port 23 is open permitting compressed air to push against piston 26 moving it in the direction of the arrow, while compressed air momentarily escapes through port 21 and acts against disc valve 34, which is however of much smaller area than the piston.

The compressed air also acts on the unbalanced area of disc face 36 exerting force to hold the valve rod 31 against a premature movement with the piston 26 due to the friction of piston rod seals 32. The piston will therefore accelerate rapidly in the direction of the arrow in Fig. 2 until it contacts stop 40, snapping discs 34 and 36 into position to close their ports. Since disc 36 is greater in area than disc 34, no drag on the piston is caused by the valve rod 31.

The valve action thus is positive and a desired shift of the valve rod in the direction of the arrow in Fig. 2 occurs only after the piston face contacts face of stop collar 40. The piston and valve rod now travel together in the direction of the arrow until the piston face makes contact with cylinder shoulder 42, which stop, as desired, again is sudden and uncushioned, producing shock and vibration. As in the return stroke, the valve rod is permitted a slight overtravel in order to be sure that the piston stop shock is taken on shoulder 42 and not on the small end area of the valve rod end. Again a positive valve position is maintained whether the valve rod is held against the head face or slightly spaced therefrom, since the seal faces of bores 21 and 23 are wide enough to remain in engagement with discs 34 and 37 for the small distance of such a gap. The valve is now set for another exhaust stroke, as explained above.

The recoil or bounce of piston 26 from the stops at the end of the power and exhaust stroke is fast and will thus serve to increase the shocks per minute, and thereby the rate of frequency of vibration.

All of the above description is based upon the assumption that the vibrator is operating under full air pressure and its positive action, such as a positive spring return and positive setting of the valves while operating, has been pointed out.

The following discussion will describe the action of the vibrator during stops and starts in order to show that there is no position or "dead center" from which the vibrator will not start.

As a control valve, a stop valve in the air line to the vibrator (not shown) is closed, the air in the line between the valve and the vibrator continues to expand and keeps the vibrator operating at a diminishing rate until the air is exhausted, or until an internal force balance between the vibrator parts have brought it to a stop. The positions of the vibrator parts after such a stop must be so that when compressed air is again admitted, the vibrator will be able to start and that there is no position from which it will not start.

The vibrator, in the momentary position while on the exhaust stroke shown in Fig. 1, could not come to a standstill since the working space 27 is open to the exhaust by way of passages 28, until the spring 30 and compressed air in space 33 have forced the piston and the valve rod into the power stroke position, shown in Fig. 2.

A stop of the valve rod between the position shown in Fig. 1 and 2, that is without ports 21 and 23 being closed, is impossible, because even if there were a residue of pressure remaining in chamber 24a after the control valve is closed, this pressure would be dissipated through ports 17 or 21 and 23 since spaces 27 and 19 are momentarily interconnected while the piston is still under spring pressure, which would carry the valve rod 31 to a stop against the valve head as shown in Fig. 2 ready for a positive power stroke as soon as compressed air is again admitted.

From the above discussion, it is obvious that the vibrator cannot stop in any exhaust position, but that it therefore must come to a stop in a power stroke position.

If a residue of air pressure is cut off during a power stroke, the air already admitted would expand against the spring pressure and air pressure in space 33 until an equilibrium is reached after which spring pressure would return the parts to the position shown in Fig. 2.

If the residual compressed air in chamber 27 were able to move the piston 26 past the point of contact with stop 40 until the seal between wall of recess 18 and disc valve 34 is broken, the air would exhaust through port 17, and spring 30 would finally return the plunger into the position of Fig. 2.

While I have specifically described and illustrated the preferred form of the compressed air operated vibrator of my invention, it is to be understood that the described embodiment is not limitative of the scope of the invention, since various changes may be made therein by those skilled in the art without departing from the scope of the invention as defined by the appended claims.

I claim:

1. A compressed air operated reciprocatory vibrator comprising: a cylinder having a valve head portion at one end and a cylinder head closing the opposite end of said cylinder; inlet and exhaust ports arranged in said valve head; a piston having an axial bore therethrough in said cylinder; abutments carried by said cylinder against which said piston impacts at each end of its travel in the cylinder; a valve rod slidably mounted in the bore in said piston and permanently contained within said cylinder; valves mounted on said valve rod and immovable relative thereto; stops on said valve rod limiting relative movement of the piston and valve rod and arranged to insure that the valves carried by the valve rod are positioned so as to enable the piston to make a working stroke at the completion of each exhaust stroke; and resilient means positioned between the piston and cylinder head and compressed by the piston during the working stroke thereof and effective to return the piston to starting position.

2. A vibrator as set forth in claim 1 and in which said valve head portion is provided with an axially located exhaust port recess, the exhaust port opening axially out of said recess and being of less diameter than said recess; and a disc-like exhaust valve carried on one end of said valve rod and adapted to enter said recess to close said exhaust port at the termination of the exhaust movement of the vibrator.

3. A vibrator as set forth in claim 2 and in addition comprising means to control the speed of reciprocatory operation of the device by adjustment of the area of the exhaust port.

4. A vibrator as set forth in claim 2 and in which the valve head portion of the cylinder is provided with inwardly projecting and spaced first and second walls defining an exhaust port chamber, an inlet port chamber, and a working chamber, all said chambers being axially aligned, the walls adjacent the exhaust port chamber being provided with a central axial opening of the same diameter as the exhaust port recess and adapted to be closed at times by the location of the disc-like exhaust valve within said central axial opening, and opened at other times by axial movement in either direction of the exhaust valve from said opening.

5. A vibrator operated by compressed air comprising: a cylinder having a valve head portion at one end and a cylinder head closing the opposite end of said cylinder; an axially located exhaust port recess in said valve head portion; an exhaust port opening axially out of said recess and being of less diameter than said recess; a piston in said cylinder and having an axial bore therethrough; a valve rod slidably mounted in the bore in the piston and permanently contained within said cylinder; spaced first and second walls projecting inwardly from the valve head portion, the first wall defining an exhaust chamber between it and the exhaust port recess, an inlet chamber bounded by said first and second walls, and a working chamber between the second wall and the piston; a disc-like exhaust valve member carried on one end of the valve rod and adapted to enter said exhaust recess to close it at the termination of the exhaust movement of the vibrator, the first wall being provided with a central axial opening of the same diameter as, and adapted at times to be closed by, the disc-like exhaust valve member; an axial opening in the second wall of greater diameter than the opening in the first wall; a second disc-like inlet valve member carried by said valve rod and of greater diameter than the exhaust valve, and positioned to close the opening in the second wall at the time the exhaust valve closes the opening in the first wall; an abutment carried by the valve rod adapted to be contacted by the piston on its exhaust stroke, said abutment being held against said piston due to the greater pressure acting on said inlet valve than on said exhaust valve during the movement of the piston toward the exhaust port; passages in the wall of the valve head portion connecting the working chamber and exhaust chamber; a stop mounted on said valve rod and contacted by the piston in its working stroke, said abutment and stop being arranged to insure that the valves carried by the valve rod are positioned so as to enable the piston to make a working stroke at the completion of each exhaust stroke; abutments carried by said cylinder against which said piston impacts at each end of its travel in the cylinder to impart shock and vibration thereto; and resilient means positioned between the piston and cylinder head and compressed by the piston during the working stroke thereof and effective to return the piston to starting position.

6. A vibrator as set forth in claim 5 and in which the face of the wall defining the working space constitutes a stop impacted by the piston at the termination of its exhaust stroke.

7. A vibrator as set forth in claim 6 in which the stop impacted by the piston in its working stroke is provided by the edge of a peripheral portion of reduced diameter of the cylinder head end of the cylinder.

8. A vibrator as set forth in claim 5 and in addition comprising sealing means between the periphery of the piston and the inner surface of the cylinder and further sealing means between the surface of the valve rod and the wall of the bore through the piston, thereby defining a permanently enclosed air space between the face of the piston and the cylinder head closing one end of the cylinder; and a compression spring mounted in said space.

9. A compressed air operated vibrator comprising: a cylinder having a valve head portion at one end and a cylinder head closing the opposite end of said cylinder; inlet and exhaust ports arranged in said valve head; walls in said cylinder apertured to provide ports; a piston in said cylinder and having an axial bore therethrough; abutments carried by said cylinder against which said piston impacts at each end of its travel in the cylinder; a valve rod slidably mounted in the bore in said piston and permanently contained within said cylinder; a stop on said valve rod limiting relative movement between the valve rod and the piston in the exhaust stroke of the latter, and inlet and exhaust valve members formed integrally with the valve rod as portions of greater diameter than said valve rod; and a sleeve secured on said valve rod and on the opposite side of the piston to the increased diameter portions of the rod and limiting relative movement of the rod and piston in the working movement of the latter, said stop and sleeve on said valve rod being arranged to insure that the valve members formed on the valve rod are positioned relatively to the inlet port so as to enable the piston to make a working stroke immediately following each exhaust stroke.

References Cited in the file of this patent
UNITED STATES PATENTS

| | | |
|---|---|---|
| 725,340 | Hightower | Apr. 14, 1903 |
| 2,477,359 | Barksdale | July 26, 1949 |
| 2,631,573 | Levitt et al. | Mar. 17, 1953 |